Dec. 11, 1945.    D. K. WARNER    2,390,859
COMPRESSION AIRPLANE
Filed Sept. 23, 1942    2 Sheets-Sheet 1
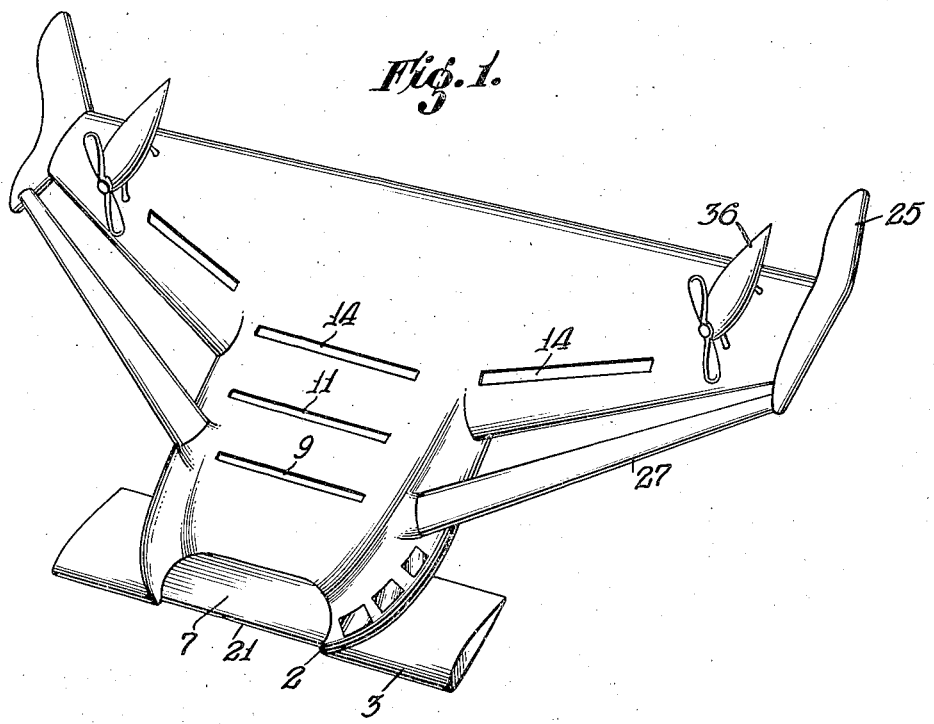
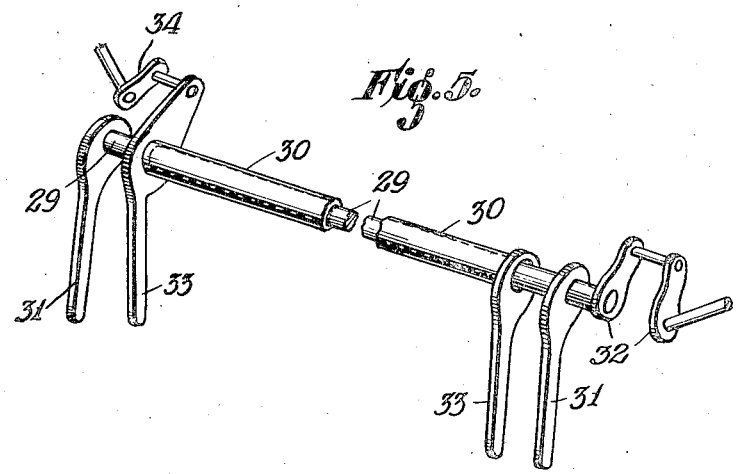

Dec. 11, 1945.   D. K. WARNER   2,390,859
COMPRESSION AIRPLANE
Filed Sept. 23, 1942   2 Sheets-Sheet 2
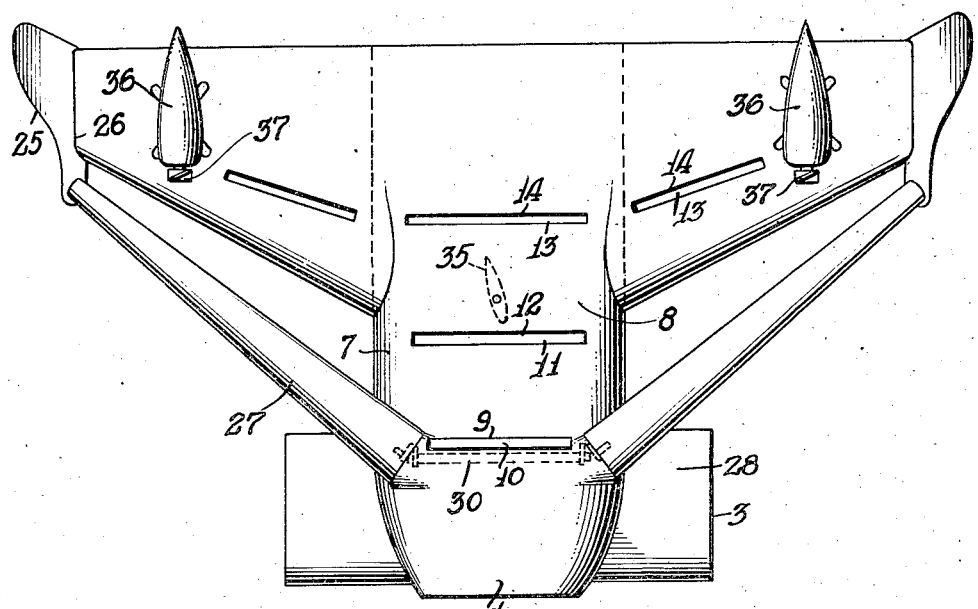
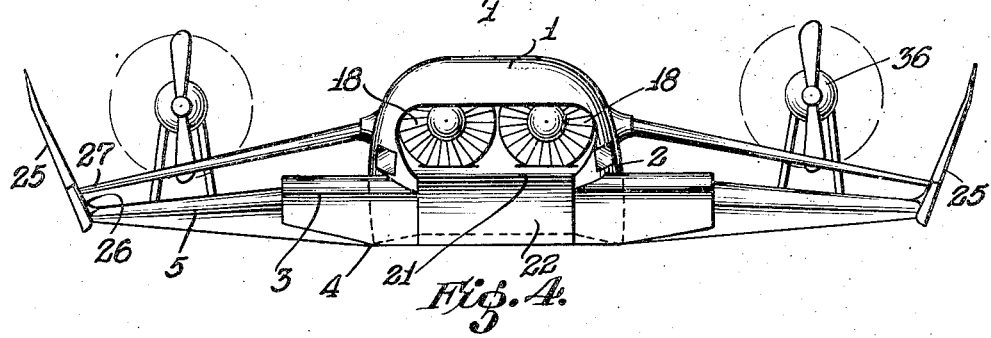
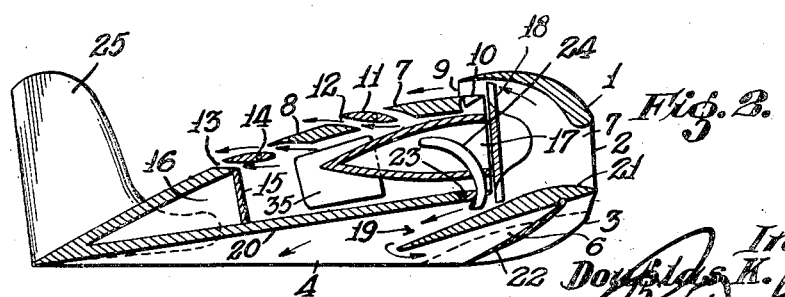
Inventor:
Douglas K. Warner,
by Percy Tate Griffith
Attorney.

Patented Dec. 11, 1945

2,390,859

UNITED STATES PATENT OFFICE 2,390,859

COMPRESSION AIRPLANE

Douglas K. Warner, Sarasota, Fla.

Application September 23, 1942, Serial No. 459,464

21 Claims. (Cl. 244—15)

This invention relates to aircraft, especially compression airplanes, of the type disclosed in my copending application for patent, Serial No. 421,457 and my Patents Nos. 2,364,676 and 2,364,677 of Dec. 12, 1944, in which by the coordination of a jet propulsion power system, housed in the fuselage within the leading edge of the plane, a pressure chamber beneath the same, and an especially planned plane body, wings, and other elements or accessories, I secure the result of a plane of vastly increased power and speed, carrying capacity, ease of take-off at quickly-high take-off speed over a short starting course, with the safety and stability in flight which are conditions precedent to flying at all.

Primary objects of my invention, mostly or measurably in common with those cited applications, though to a greater degree of attainment, are to provide a plane which will, for a given quantity of fuel, both fly at a higher speed, carry an immensely heavier pay load, start quicker with a heavy load, get off the ground or other take-off surface quicker, be stable longitudinally, laterally and in yaw, land in short space, safely, accomplish all this with a smaller plane, require a smaller engine, less cost of manufacture, operation and maintenance.

Further and more especial objects of the present invention distinctively, contained in this application, are to control the plane powered so strongly by its jet propulsion and pressure chamber combination, by a distribution of that power in a manner to direct part of the engine power to a jet upon and over the plane body and wings; to utilize part of the pressure derived from the said power plant and the forward motion of the plane combined together, to create a high vacuum over the entire body of the plane wholly over its upper surface both of wings and fuselage, while still providing and maintaining a powerfully high pressure underneath the plane fuselage, and this far more than merely confining such an overhead vacuum to a small area over the leading edge, which would in no way accomplish the objects nor operate the plane in the manner of this new invention; to permit the use of rather small craft by enabling them to fly over the wide and high waves of ocean and other rough water, whereas heretofore such craft have necessarily required to be made large enough to linearly bridge two such waves; to do this without materially diminishing the enormous load capacity of these planes made according to my inventions heretofore; to operate and control the plane in low or high flight or near-surface skimming by shifting the amount and direction of the air-blast discharged by the engine not only from under to upper surface, but varyingly at such distances from the engine as may be decided in flight-operation by the pilot; to assist quick and easy changes of the attack angle, to aid turning, and backing, by instant changes of air-foils of adjustable angle at either side of the plane; and to add greater strength, stability, security and simplicity of construction, and concomitantly eliminating elevator air-foils, ailerons, outside rudders or other factors of empennage and parasite drag.

With these and other subordinate objects in view, my present invention, and amplification of my previous inventions cited, embodies several important elements of innovation, viz: first, while I direct a powerful air-jet beneath the plane as I have done before, I use two or more diffusion chambers in transforming air-velocity of ram-compressed and engine-compressed air, as well as an admixture thereof with exhaust, into pressure; second, I partly re-direct the air or admixture from the under pressure chamber at will of the pilot; third, I direct said re-directed air-blast alternatively to various orifices in the upper surface of the plane body, including the wings, to decrease the air pressure over all or desired portions of the upper surface; fourth, again alternatively, or simultaneously direct varying portions of the air to the under pressure-chamber and direct also air to one single point of the upper surface, or to two points thereof, or shunt much of it all back over the far wings above the same; all of which cut-off and trans-directional variations are achieved by a series of orifices of discharge and by flaps of coverage or partial limitation; fifth, I provide a special form of plane-body and wings, or combination of all these in what is actually one unit body, one wing with engine housing at its leading edge, inside it, which structure is especially invented to coordinate with the other herein-stated elements; sixth, I provide a pair of adjustable, rotatable, pilot-wings controllable by the pilot to alter their angle; seventh, I provide means to shift the centre of gravity forward by movement of the fuel from its normally-occupied tanks in the tail forwardly to load the forward portion; eighth, I mount two nacelles and engines with propellers, to locate a third source of power and propulsion above the main wing, in conjunction with the main engines; and finally my present invention comprises various other details of construction disclosed in the further matter of this specification, the whole of such features herein generally and specifically recited contributing to the objects outlined, and also to the elimination of all danger-tendencies, to which most innovational and progressive improvements in this art are so prone.

The more particularized description hereinafter of the complete structure and mode of operation of my airplane, will now be more clearly comprehended, with this preliminary statement of its objects and principal constituents.

In the accompanying drawing forming part of this specification, in which like numerals of reference designate like parts in the several views:

Figure 1 is a perspective view, partly in plan and partly in front elevation, of a plane embodying my invention.

Figure 2 is a central longitudinal section of the same, omitting therefrom the twin nacelles and propellers which are mounted upon and forward of the trailing edge of the plane.

Figure 3 is a plan view of the plane, enlarged.

Figure 4 is a front elevation also enlarged relatively to the scale of Figures 1 and 2.

Figure 5 is a detail of part of the operating mechanism of the pilot-wings.

The plane embodies very little fuselage, such as there is being formed practically integrally with and a continuous part of the main wing, the interior of the fuselage being in communication with, and unitary with, the interior of the wing. At the leading edge of the plane, the nose 1 which contains the housing of the fuselage for the engines and propellers or compressor-fans, is constructed in the form of a hollow shell generally U-shaped in front elevation as seen in Figure 4. Its sides 2 are at their lower portions protracted into laterally projecting floats 3, adapted for buoyancy and support of the plane on water or on deck, ground or other resting surface, and especially when skimming over a sea, bay or river. These sides 2 each contain a cabin for a pilot on each side, where the co-pilot system is used, or otherwise for pilot and passenger, gunner, navigator, according to the character of the plane; neither of these cabins being illustrated, they being of any usual style, but the perspective Figure 1 shows windows in one side indicating them. The floats, however, are thick and of higher attack angle than the fuselage or rear wings.

Rearwardly of these floats the under edges of the sides 2 are formed into runners 4, which extend to and underneath the main wing 5 to the trailing edge of the plane.

The upper portion of the nose 1 of the fuselage, its sides 2, and its under portion 6, are all contracted forwardly to form the entrance to a diffusion-chamber 7, which is of diminished diameter at front and is flared and widened rearwardly to make this chamber 7 thereby a diffusing instrumentality. The nose is formed at top with a rearwardly and upwardly cambered surface corresponding to said inwardly flared diffusion-chamber.

An appreciable distance below the rear end of the nose, upon its top surface, the roof 8 of the plane drops to a point beneath said nose-top, leaving a transverse orifice or slot 9 between said rear edge of the nose-top and the said roof 8, which said roof projects forwardly into the diffusion chamber 7 in the form of a laterally-disposed flap 10, hinged at its rear end to the main sheet of the roof 8, so that it is movable upon said hinge to elevate its free front end to contact with the nose-top and partly close the orifice 9. This flap motion is under the control of the pilot of the plane, by any desired and usual means not forming in its specific structure any part of my invention, and therefore not illustrated in the drawing, as is true of all the usual and customary driving and steering and control instruments which implicitly are included in its mechanism when manufactured for actual use.

A predetermined distance rearwardly of this orifice 9, is formed in the roof 8 a second orifice or slot 11, parallel with the orifice 9, the roof 8 back of this orifice 11 being dropped slightly though not necessarily to the same extent as the drop of the roof beneath the overlapping nose-top at the orifice 9.

A flap 12, hinged at its front end to the roof 8 to leave it free to swing upward to open and downward to close the orifice 11, is mounted in said orifice 11 and is similarly controlled by the pilot. Further rearwardly at a nearly equal distance back, is a third orifice or slot 13 provided with a flap 14; but this orifice is a triple orifice, of which the central portion ranges transversely across the main wing 5, and the right-hand and left-hand sections are diagonally-disposed as shown in Figure 3, and the flap 14 is also in three separate sections, each individually hinged, and they may be opened or closed either independently or simultaneously by the pilot. Air outflow from the principal orifice 9 will be over the top of the flap 10, while air outflow through the orifices 11 and 13 will be from under the flaps 12 and 14.

Immediately back of the orifice 13, the plane body is partitioned off interiorly by a wall or partition 15, vertically placed therein, which leaves the fuel storage compartment 16 in the tail of the plane. This space holds the fuel-tanks, and while I have shown no separate compartments or units of fuel storage, it will readily be understood that any number of divisions or containers may be made or placed in this fuel storage space. It is also understood that not only is the fuel to be stored in the tail for utilization of an unused part of the plane, leaving the whole of the main interior otherwise open to the compressed air-blast, except for the cabins in the sides of the fuselage, but that also this fuel is placed there for two additional purposes, first, the ballast and counterbalance effects, second, the pilot transfer of fuel from the tail to a point forward thereof to shift the centre of gravity, as will hereinafter be more fully described. Where the compartment 16 is subdivided into cells to make separate tanks, it is walled by thin partitions of plywood, glued with gasoline-proof formaldehyde resin glue.

Within the fuselage-nose 1 of the plane, rearward of its leading edge, are located two or more engines 17 and fans 18, set at an incline, fans front, and up. These engines and fans discharge a blast of ram-compressed and blower-compressed air in immense volume with considerable energy, rearwardly of the engines and above and below the same, in the following directions viz:

A portion of the volume of air from the propellers 18 is directed downwardly and rearwardly beneath the forward portion of the fuselage into a concaved pressure chamber 19, formed in the under portion of the body at its forward end, in great depth, continuing under the entire main wing 5, and decreasing in such depth gradually to the trailing edge of the plane. Another portion of said air leaves directly from the top of the propeller out over the upper surface of the plane-body through the orifice 9 existing between the roof of the nose and the roof of the main body, and the remaining portion is compressed within the body for release thereafter through the orifices 11 and 13. The floor 20 of the plane, which is elevated at front and drops to the rear, and the sides 2 of the fuselage, and the runners 4, which continue longitudinally under the wing throughout the whole length of the plane, combine to form the pressure-chamber 19, which is further delimited by certain forwardly located elements. First, the floats 3 form a portion of the under leading edge of the plane, at the commencement of the pressure-chamber 19; and between said floats 3 which also project inwardly under the diffusion entrance chamber 7 of the fuselage-nose, is mounted an airfoil 21, about as close to the propellers 18 at bottom, as the roof of the nose is at top, with the effect of chambering said propellers. The air-foil 21 is narrow-edged, cambered on its upper surface and slightly on its lower surface, and coming likewise to a sharp rear edge.

Beneath this air-foil 21 depends a substantial, effective, wide and deep flap 22, hinged at its top to the front of said air-foil 21, which flap operates automatically to seal the pressure-chamber 19 at front against the escape of compressed air, this flap being normally swept up by outside air-resistance in the flight of the plane.

At the front edge of the floor 20 of the plane is a flap 23, similar to the roof flaps 10, 12 and 14, hinged at its rear to the said floor, and projecting forwardly to a point as near as feasible to the propellers 18, to measurably shut off air inflow or outflow from and to the pressure chamber 19 and the interior diffusion chamber 7 and the interior of the plane-body back thereof. This flap does not absolutely close off air totally in either direction, because first, air from the lower arc of the periphery of the propellers will continue to force ram-compressed and engine-compressed air into the pressure chamber. But it affects the major volume of such air both ways between said pressure-chamber 19 and diffusion-chamber 7 and plane interior. The space between the air-foil 21 and the floor 20, and the flap 23, forms both a continuance of the diffusion-chamber 7, and the forward part of the pressure-chamber 19. An exhaust pipe 24 protrudes from the engines through a notch in the flap 23 or in the space between it and the propellers, to mix exhaust gases with the compressed air of the engines, which is discharged into the pressure-chamber 19.

From the fuselage of the plane, near a rearward orifice in its roof, the main wing 5 extends rearwardly outwardly, and laterally at a sharp diagonal from the fuselage, being continuous therewith both exteriorly and interiorly. This wing 5 terminates at each side in wing-tip fins 25, relatively large and high, being low in front, and gradually rising in height at the trailing edge of the plane. Seen in front elevation, in Figure 4, they have the shape of thin plates, set at a dihedral angle, and in profile, Figure 2, have an ogee curve upwardly. They are blunt at their lower forward ends, and at their junction with the main wing 5, are formed with a large fillet 26. They extend below the wing slightly, to give a downward direction to outward airflow from below.

At a point near the top of the fuselage, at each side, are pivoted adjustable and rotatable auxiliary air-foils or pilot-wings 27, which are wider at their inner ends at the junction thereof with the fuselage, and taper in width to their outer ends, which are connected pivotally to the fins 25, to be rotatable as at the inner ends, which are mounted in brackets 28 on the roof of the fuselage. These wings are under the control of the pilot, who can rotate one or both wings 27, to any degree desired. The manipulation and adjustment to a desired angle of rotation, can be effected by any usual mechanical means, or adaptation for the purpose. No such means or connections to the pilot-wings is shown in the several figures of my plane in the drawing, but in a detail view in Figure 5 I illustrate one such mechanism which may be used, and which is symbolically represented in dotted lines in Figure 3. This embodies two shafts 29 and 30, the former mounted revolubly within the latter, the inside shaft 29 carrying at each end levers or shift-rods 31, suitably journaled in any bearings desired, and attached to the shaft 29 to turn it, the said shaft having at one end only crank-lever devices 32 leading to one of the wings 27; while the outer shaft 30 carries near each end similar levers or shift-rods 33, connected by crank-lever devices 34 to the opposite pilot-wing. There are thus two operating levers at each end of the mechanism, respectively under the control of a pilot in the right-hand cabin of the plane, and under the separate control of a co-pilot in the left-hand cabin, if there be two pilots, or under the control of a single pilot optionally seated in either cabin selected.

It will be noted that in the fuselage-nose, in the diffusion-chamber 7, I show two of the jet-propulsion engines with their blower-fans. I may employ any number of engines required, and contemplate the use of many small multiple engines, preferably multi-cylindered radial engines. These, or the mere pair shown, permit operation of the plane in an engine-control system, as will be hereinafter described. Whether such system be used or not, I provide an inside rudder 35, shown in dotted lines in Figure 3, which it will later be seen is used in connection with the pilot-wings 27, in operation, and also in connection with the engines on each side of the diffusion-chamber 7, though where the pilot elects to operate the plane with the double-engine control, this rudder 35 is not indispensable, but auxiliary, or may be found in practice to be omittable, especially when the pilot-wings 27 and the double-engines are employed.

Upon the main wing 5, near its trailing edge, are mounted two nacelles 36, each of which contains an engine and propeller 37, operating exteriorly upon the plane in open air, though I do not restrict the engines and propellers in this respect. These additional engines and propellers are not in lieu of any of the main engines and propellers housed in the nose of the plane, but supplemental thereto, and even though I may employ hundreds of engines and propellers in the inside equipment previously described, the nacelles and outside propellers will still be employed in combination therewith, the purpose of these engines upon the upper face of the wing being to cooperate with the main power-plant in a manner that will appear in considering the mode of operation of my plane. These nacelles, in a very large plane embodying my invention, may even themselves be powered by multiple engines, they and the underbody power-plant being at the one time independent of any increase in the size of one or the other, yet distinctly mutually-operative in unison and balance, both in the propulsion, manœuvring, steering and handling, stabilizing and control of the plane, either in skimming, flying low or in high air, particularly at moderate speeds.

From the foregoing structural description of my invention, it will not only be easily understood how to construct the plane, but the mode of operating it will not be difficult to comprehend, with the following explanation, especially if the brief preliminary statements of the objects of the invention and in what it primarily consists, hereinbefore precluded, are noted.

The main engines being gunned, and it being assumed that the roof flaps 10, 12 and 14 partly cover the orifices 9, 11 and 13, only partly, and that the low flap 23 beneath the front propellers is wide open, and that the rear engines in the nacelles 36 on the trailing edge are also gunned, the first effect will be that ram-compressed air will be drawn into the diffusion-chamber 7 by the forward propellers and blown directly into the pressure-chamber 19 after passing through the diffusion-chamber 7. This air will be at comparatively low velocity, increasing as the plane flies, as is also the ram-compressed air, and by reason of the flaring of the inside of the nose and therefore of this diffusion-chamber 7 rearwardly, the velocity of said compressed air will be turned measurably into pressure. This pressure-air will initially be discharged or ejected directly into the pressure-chamber 19 behind the lower area of the compressor-fan propellers. It will at once strike the air-foil 21, and as the shape of this air-foil and the trend of the floor 20 of the plane-body are such as to direct this air expansively longitudinally and diagonally into the pressure-chamber and also by a flare of said space between the floor and air-foil the said air is further diffused, it finally is ejected in an intense pressure beneath the plane, at such an angle that it impinges against the ground, water, deck or other surface from which the plane is taking off. This pressure instantly lifts the plane off the surface and the blasts through the orifices in the roof send it swiftly forward.

Next, the pilot operates the various flaps 23, 10, 12 and 14 in such manner as he deems best, so as to direct the air-blasts in the best way to control the plane and manœuvre it. At the outset, the rear auxiliary propellers 37 will have co-operated with the main engines in a complementary way, namely, as the blast beneath the plane gives it an unusual lift, not only of its front but also of its whole body, the rear propellers give the plane an impetus from above and at rear, so that, without depleting the effect of the main power-plant below and front, these propellers 37 add a commensurate and proportionate sustaining and forward action. The pilot may now decide to open wider the first flap 10, over the orifice 9, and this shoots out air which has been diffused and transformed from higher velocity to higher pressure and then to high velocity at high pressure, into a stream upon the top of the plane, creating a high vacuum over the roof of the plane, giving it added lift, support, increased forward speed, and on the whole, much added stability. The action of the rear propellers, and of the air-blast through the opened flap 10, are not identical in all features, though they coincide in some. While they both stabilize greatly, while they both add speed, and both increase the immense lift of the main power-plant, the rear propellers do all this without depleting the main lift and drive of the main plant and with higher efficiency at slow speeds, while the open-flap operation gives high upper surface lift and lower propulsion efficiency at low speed, becoming more efficient propulsion than the rear propellers however at high speed; and while the propellers upon the top of the wing add thrust, lift and stability there, the flap-opening and discharge of air therethrough and creation of high vacuum, produce this effect at a different point relatively to gravity-centre and pressure-centre than the rear propellers affect. The rear propellers have their quota of effect at all times, regardless of the extent of the power below, so that they come into action without reference to the action of the pilot in throwing the main power as he wills. The rear propellers may be speeded up by the pilot or let stand as they are constantly. If the flap 10 is open, the two upper-surface power-sources work together.

Similarly, the pilot may open roof-flap 12 or 14 alternatively, instead of flap 10; or he may open any two or all of them, with any varying manipulation of flap 23 desired; coincidentally with slowing or speeding of the rear propellers.

The lift of the main power-plant is not all forward as, the air-blast below is projected and sustained underneath the entire floor of the plane, and is impinged diagonally downwardly against whatever surface is beneath the body either in starting or skimming or flying, including the deep body of air in high flight, which at the speed attained by my plane, is blasted against by my power-plant in much the same manner as against the take-off surface, in different degree of course.

While I have described the take-off and following steps of operation so far, on the assumption that the pilot commences with the roof-flaps partly closed, and the floor-trap 23 open, the nacelle-engines gunned also, it is not necessary that the plane be started exactly in that position of the factors, and that assumed set-up may be completely varied. As the operation of the parts above-described, in any variation of set-up, will be obvious to anyone, I do not deem it necessary to elaborate on that change or changes to take-off.

The exhaust from the engines through the pipe 24, is added to the mixture of ram-compressed and engine-compressed air, and this exhaust acts in conjunction with the diffusing devices to change velocity to pressure, or to reduce the former with concomitant increase of the latter. In the event that the plane is flying satisfactorily in all respects but that the power below is too much for the best effects, the flap 23 may be lowered, leaving all other conditions unchanged, for a while, in which case less of the air from the lower part or under-discharge of the propellers will reach the pressure-chamber 19. Any back-draft or leak of air to the front of the plane, past the air-foil 21 and the leading edge, will be checked automatically by the flap 22, actuated by the very air that seeks to escape.

The auxiliary air-foils or pilot-wings 27 being under pilot-control, either of these wings, or both of them at once, may be rotated to any degree desired, in any emergency or condition of flying or skimming. To elevate the forward edges of these pilot-wings 27, is to alter the attack angle of the same, and increase it as much or little as desired. To raise one pilot-wing, and not the other, is to alter the lift and centre of pressure of that side of the plane only, as for example, when the pilot wishes to bank the plane. To elevate the edge of one pilot-wing, and simultaneously depress the opposite wing, is to give a powerful alteration of lift on both sides of the plan oppositely, calling for pre-calculation of the effect carefully beforehand.

The pilot-wings 27 being set ahead and higher than the main wing 5 thus while skimming, all the air that is trapped in front of the main wing 5 must rise and contact these pilot-wings 27, as such air cannot go into the ground and the fins 25 are large and deep enough to prevent its escape sideways. These pilot-wings increase the lift of the plane from 50% in high altitude to about double on the ground, owing to their higher position, and to their adjustability of angle, and to the various novel elements of structure of this plane and of its operation, to which said pilot-wings not only contribute, but with all of which they cooperate in flight. The control by these pilot-wings may take the place of all elevators and ailerons more effectively and with marked elimination of fragmentary features of parasite drag, impairing efficiency by resistance at various points, and said pilot-wings being located far from the water, can offer no disadvantage there.

This plane remains stable in all conditions more than ordinarily, and in the form shown, to aid such stability, when rough water is encountered in skimming, the tail rises, causing some of the fuel in the fuel storage compartment 16 to flow forwardly to the front portion of the plane, where provision may be made for receiving it, in any usual manner.

The vacuum created over the top of the plane is distinctly not confined to a small area behind the leading edge, but is as stated, spread all over the roof and main wing; the obvious advantages of which will be understood by all versed in the art. The compressed air leaving the roof-orifices 9, 11 and 13 at high velocity provides a considerable quantity of the propulsive energy as well as maintaining a powerful vacuum lift over the top surface. Less lift is of course obtained hereby than from the pressure in the pressure-chamber 19 where velocity has been reduced in such substantial part to pressure; yet the vacuum-lift may approach half the intensity of the pressure-lift below, while skimming. Away from the ground, (except at very high speed) the top negative pressure lift is greater than the positive pressure lift. The stall point is 45° or more, due to the roof-orifices, the pilot wings, the upper surface propellers, and very short thick stabilizers at front. When the two forward roof-flaps are shut and air discharged through the wider rear orifice 13, this increase of air-outflow at the rear moves back the centre of pressure and lifts the tail of the plane; this with more efficiency than with an elevator. The tail is also lifted or depressed by adjusting the attack angle of the pilot-wings accordingly.

In banking at turns, the pilot controls the discharge of air through the orifice 13 particularly, together with, especially, the outer lateral portions thereof in the wings, and thus by so discharging air through one side orifice, he banks and turns the plane with the propulsion lift so gained over the wing, and also the pilot-wings may be adjusted separately, as before stated, and it will be noted that the rudder 35, being hinged inside, coincides in correctly banking on the needed side therefor. But where double engines, or two sets of multiple engines, are used, the right-hand engines may be walled off from the left-hand inside the plane-body, and the steering be wholly by throwing one engine or set of engines on wholly and cutting the opposite ones in part or whole, and in this case the rudder 35 may be dispensed with; particularly as the pilot-wings cooperate with the one-side engine power, by being turned on the proper side to raise or lower that side of the plane in appropriate banking. The throttling down of the engines at one side, producing a greater relative speed of air through the roof-orifices on the opposite side, can make the correct turn without this rudder; the most sudden turn possible may be made by cutting out the rear edge nacelle propellers on one side, which will drop the runner 4 on that side, into the water, causing the plane to spin around this point.

Various modifications may be made in details of my plane depending upon the character of its intended use, its size and other considerations, and I do not restrict myself as to such. But on the other hand, my plane involves the combination of many factors and elements indispensably inter-dependent, none of which can well be eliminated unless by some improved substitute. For example, in some certain size of plane I might omit the nacelle propellers, or place them further forward; but in another size or character of plane I might find the rest of the structure and operation disturbed faultily without their cooperation with the other elements in the joint action herein defined. In a very large plane I might employ a larger number of the orifices in the roof, or alter their disposition relatively to the main engines housed in the fuselage-nose in front of them. Or make minor or even major improvements in my plane in many respects without departing from the spirit of my invention, within the purview of my claims.

Having thus fully described my invention and its manner of construction and operation, what I claim as new and desire to secure by Letters Patent is:

1. An airplane having one or more engines mounted in its fuselage, interiorly-operating compressor fans within said fuselage, driving connections between said engines and fans, a pressure-chamber beneath the floor of the plane high at its forward end, and continuing downwardly diminishing in height to the rear, open to the ground, water, air or other surface beneath, means for discharging compressed air into said pressure-chamber and against said surface beneath and out at the trailing edge, to create a combined lift and propulsion effect in and under said pressure-chamber, and means for directing a portion of said compressed air from the engines to the upper surface of the plane, to create a thrust and lift thereover the fuselage of the plane being formed with an entrance chamber which is rearwardly flared forwardly of the engines, to provide a diffusion chamber initially diffusing the ram-compressed air before it reaches the fans, and the said pressure chamber being also flared or expanded rearwardly to form another diffusion chamber beneath the plane.

2. An airplane having an open pressure-chamber beneath the floor of the plane extending from the leading edge to the trailing edge, engines and compressor-fans discharging compressed air into the pressure-chamber, and also over the top of the plane to provide pressure lift from leading edge to trailing edge, means for diverting part of said compressed air from said compressor-fans to the air above the plane-roof to create vacuum lift and propulsion thereover, a main wing extending laterally and rearwardly to the trailing edge of the plane, auxiliary airfoils or pilot-wings mounted forwardly and above the main wing, and extending diagonally rearwardly from the fuselage of the plane to the outer ends of the main wing, and pivoted to be rotatably adjustable in incidence-angle.

3. An airplane having a pressure-chamber beneath its floor to provide pressure lift and propulsion from beneath the same, engines and compressor-fans discharging into said pressure-chamber, means for regulating the inflow of air thereto from said engines and compressor-fans, means for directing air to the upper surface of the plane to create a vacuum lift and propulsion thereover, both said regulating and directing means being under control of the pilot of the plane, a main wing extending laterally and diagonally rearwardly from the fuselage to the trailing edge of the plane, and arranged to receive over it the vacuum lift and propulsion from the diverted air directed to its upper surface by the pilot, and auxiliary air-foils or pilot-wings mounted above and in front of said main wing and extending diagonally rearwardly and outwardly, said pilot-wings being pivotally mounted and under the control of the pilot to rotate and alter the angle of incidence during the flight of the plane, said pilot-wings serving as higher-level air-foils to catch air trapped in front of the main wing to direct it over the same, and as control elements to change the lift and centre of pressure of said main wing, thereby changing the flight path of the plane, to any direction or degree of ascent.

4. An airplane having a pressure-chamber beneath its floor, engines and compressor-fans discharging into said pressure-chamber, a main wing extending laterally and rearwardly at a low incidence angle and coinciding at its rear with the trailing edge of the plane, means for establishing an additional lift and propulsion upon the roof of the plane, over substantially the entire area of the said main wing, concomitantly or alternatively with the lift and propulsion beneath the floor, wing-tips or fins of substantial height and area at each end of the main wing at and near the trailing edge thereof, said fins being set at a dihedral angle; and a pair of auxiliary air-foils or pilot-wings rotatably mounted near the centre of the plane at the inner ends of said pilot-wings, higher than the main wing, said pilot-wings extending diagonally rearwardly and outwardly and their outer ends being rotatably mounted in the wing-tips or fins.

5. An airplane provided with a main wing continuous with its fuselage and interiorly continuous therewith for part of its length, and being formed at its forward end with an open nose, flared to form a diffusion-chamber, engines and compressor fans within the same, said nose being contracted at the leading edge to narrow said chamber and flared rearwardly thereof, floats located at each side of the said nose and projecting inwardly thereof to contribute to the formation of the contracted mouth of said diffusion-chamber, and projected outwardly to form substantial buoyancy elements when the plane is on water, the sides of the nose or fuselage back of the floats also forming part of the diffusion-chamber, runners mounted upon the under edges of said sides and extending back to and merging with the trailing edge of the plane, the floor of the fuselage and wings being inclined from depth at front to a diminished rear, and the runners being similarly diminished in height rearwardly, a pressure-chamber at the forward end of the plane, and open to the ingress of ram-compressed and engine-compressed air and gas-exhaust from the diffusion-chamber, the said pressure-chamber being formed in part by the floor of the plane, by the floats, by the runners, and being coterminous with said floor and runners and the trailing edge of the plane, and an air-foil mounted at the leading edge of the plane between the floats, to form with the floor and runners a diffusion-chamber beneath the plane at the commencement of the pressure-chamber, and in communication with both the entrance diffusion chamber and the outer air and a flap hinged near the lower leading edge and moving between said floats over a surface below to prevent forward escape of air.

6. In an airplane the combination with an entrance chamber at the leading edge, flared outwardly and rearwardly from its leading edge to diffuse air drawn into said entrance chamber to transform its velocity in part to pressure, compressor-fans within said chamber to energize the air, engines mounted at the rear of said fans and operatively connected thereto, the nose of the plane at and back of the engines being also flared rearwardly to form a second diffusion-chamber within said plane, of a pressure-chamber beneath the plane, open below, and an air-foil inside the leading edge beneath the engines, and beneath the floor of the plane, said airfoil being inclined and arranged to form part of a third diffusion-chamber at the commencement of the pressure-chamber.

7. In an airplane the combination with an entrance diffusion-chamber, engines and compressor-fans therein, means operatively connecting said fans to said engines, a pressure-chamber beneath the plane connected and arranged to employ compressed air from said fans to create a lift and propulsion from below, and means for diverting a portion of the compressed air from said fans to a discharge through the roof of the plane to create a thrust and lift over the said roof of the plane while concomitantly the under pressure-chamber is forcing the plane up from below, a diagonally inclined airfoil or lower leading edge of the plane, slanted downwardly back from commencement of the entrance chamber whereby the air-discharge below is diagonally downward, and rearward, to the trailing edge without entering the plane-interior, while the discharge above is substantially rearward over the whole of the exterior of the wing, and nacelles located upon the main wing, having propellers operating in air over the said wing surface, to create and discharge rearwardly a third stream of air in conjunction with the two other independent air-discharges under floor and through roof.

8. In an airplane the combination with an engine chamber at the leading edge, engines in it having compressor-fans discharging compressed air into the interior of the plane, a pressure-chamber beneath the plane open to the ground, water or air beneath, orifices in the roof of the plane to direct air through the same over said roof, of outside propellers mounted upon the wing having the tip portions of said propellers closely approaching said wing surface, and being located in the roof, and back of the compressed-air entrance into the under pressure-chamber, and means for controlling the discharge of air underneath and over roof from the front fans concomitantly with the operation of the outside propellers in discharging rearwardly over the upper surface of the plane.

9. An airplane having a pressure-chamber underneath the plane-floor, engines and compressor-fans above it inside the plane, orifices in the roof, flaps covering said orifices, a diffusion-passage in the plane back of the fans and around its engines, formed by the plane sides and the roof and floor, and flaps at the forward end of the roof and floor hinged thereto, means under pilot-control for opening and closing said flaps to vary the air discharged above or below the plane, increase pressure-lift below and reduced pressure lift above, pilot wings and means to adjust the same at either side during flight to control the plane.

10. An airplane having a pressure-chamber under its forward edge, and rearwardly to the trailing edge, engines and compressor-fans above the same discharging compressed air thereinto, runners on each side thereof, floats projecting outwardly therefrom and inwardly beneath the engines, an air-foil between said floats forming with the runners and floats and the nose of the plane, the pressure-chamber in part, and a diffusion passage thereinto, and a hinged flap mounted forwardly beneath the air-foil in position to meet compressed air and exhaust which in leaving said diffusion-passage back-draughts forwardly, and to seal the front of the plane against its escape in front and under the air-foil, said hinged flap being automatically held up by the air in flight, and forced down in sealing position by the back-draught escaping, while near a surface.

11. An airplane provided with a fuselage formed with a forwardly opening chamber flared rearwardly and outwardly to form a diffusion entrance-chamber, engines mounted in the same, compressor-fans driven by said engines so mounted and arranged that their upper portions extend above the roof of the plane, and their lower portions project below the main floor of the plane-body therein, a pressure-chamber beneath the floor of the plane, a series of orifices in the roof of the plane, leading from the interior thereof to the air above the plane, wings upon said plane having orifices in each of the same discharging air therethrough from the compressor-fans, and means under control of the pilot for governing the supply of such discharged air therethrough, whereby the plane may be banked and turned by such control.

12. An airplane provided with a fuselage formed with a forwardly opening chamber flared rearwardly and outwardly to form a diffusion entrance-chamber, engines mounted in the same, compressor-fans driven by said engines in said chamber, so mounted and arranged that their upper portions extend above the roof of the plane, and their lower portions project below the main floor of the plane-body, a pressure chamber beneath the floor of the plane, means for directing part of the blast from the fans in varied degree to the pressure-chamber, means for directing part of the blast to the air above the plane, and thick floats at either side of the plane at front, the same having higher incidence or attack angle than the main body of the plane.

13. An airplane having a pressure-chamber beneath the same, engines and compressor-fans connected therewith, a main wing at either side of the plane, having wing-tip-fins thereon, pilot wings mounted above and forwardly of the main wings and having their outer ends mounted in the wing-tip-fins, and said pilot-wings being rotatable and under control of the pilot, whereby to control or assist in controlling the airplane thereby in pitch, and serve as horizontal stabilizers.

14. An airplane provided with a pressure-chamber beneath the same, engines and compressor-fans connected therewith, a main wing at either side of the plane, pilot wings mounted upon said plane, each such pilot-wing being rotatable and connected with the plane body at the inner end and with the main wing or part thereof at the outer end; said pilot wings being of large chord and set at a considerable distance forward of the main wing, and higher than its leading edge, to better utilize the total air displacement due to flight close to a surface.

15. An airplane provided with one or more engines mounted in its fuselage, with interiorly operating compressor-fans forwardly of said engines and operated thereby, the said fuselage being formed with an entrance chamber flared to provide a diffusion effect, changing the velocity of the ram-compressed air into pressure, and having a pressure-chamber formed beneath the body and bottom of the plane, open to the lower portion of the fans, and receiving therefrom compressed air thereinto, the said air being directed downwardly and rearwardly against the land, water or air beneath the plane to create thrust and lift completely and entirely below the said bottom of the plane body, a flap at the lower portion of said fans to diminish the inflow therefrom to said pressure-chamber, the compressed air from the upper portion of the fans being directed to a point above the roof of the plane, and the pressure-chamber beneath the plane-body being also flared rearwardly to create a further diffusion effect at this point, and whereby two separate lift effects will be created, one below the plane, and one above the same.

16. An airplane provided with three lift and propulsion means, containing, first, a pressure chamber beneath the plane and wholly open to the land, water or air beneath, from a point near the leading edge to a point at or near the trailing edge; second, a roof having a series of orifices therein and flaps governing the same, together with an engine and compressor fan mounted to feed compressed air from the lower portion of the fan into the pressure chamber, and to feed compressed air up over the roof of the plane through the roof-orifices; and third, propeller means upon the rear of the roof, with engines separate from the engines of the compressor-fans; all three of these means being under the control of the pilot to vary or shut off the same, or to carry all of them in operation simultaneously.

17. An airplane having one or more engines within its leading edge, with one or more compressor-fans mounted in front of said engines and operated thereby, a pressure-chamber formed beneath the plane-body but not within the same, and wholly open from a point near the leading edge to a point near the trailing edge, the said fan or fans being so mounted and arranged that the lower portion of said fans feeds directly into the pressure-chamber, and the upper portion of said fans delivers compressed air over the roof of the plane-body; and means under pilot control for varying or reducing or shutting off the air to the pressure-chamber or to the roof.

18. An airplane having one or more engines within its leading edge, fans mounted in front of said engines and operated thereby, a pressure-chamber formed under the body of the plane throughout practically its entire length, and completely open to the land, water or air beneath, the fuselage of the plane being formed internally to flare rearwardly, whereby ram-compressed air is diffused and its velocity partly changed to pressure, and the pressure-chamber being also rearwardly flared to form another diffusion-chamber at this point; and a flap hinged near the lower leading edge of the plane and moving upwardly to the said lower leading edge to be closed or raised by air-resistance, and falling or dropping to receive any air pressure from the pressure-chamber which returns forwardly under the pressure-chamber toward the said lower leading edge.

19. An airplane provided with three communicating air-chambers, first an entrance chamber for ram-compressed air, having its nose flared outwardly and rearwardly to form a diffusion-chamber; second, an engine chamber rearwardly thereof, engines mounted therein, compressor-fans mounted in front of said engine chamber and driven by said engines; third, a pressure-chamber beneath the engine chamber but outside the plane, underneath the plane-body, and open to the land, water or air beneath; the compressor-fans being so mounted and arranged in relation to said chambers, that they deliver compressed air into the pressure chamber at the lower portion of the fan-blades, and deliver compressed air from the upper portion of the said fan-blades over the roof of the plane.

20. An airplane provided with a pressure-chamber wholly beneath and outside of the body of the plane, open to the water, land or air on which it travels, one or more engines inside the fuselage and compressor-fans operated thereby, said fans being so mounted and arranged that they deliver compressed air from the lower portion of the fans into the pressure-chamber, and from the upper portion of the fans over the roof of the plane.

21. The structure of claim 4 including vertical rudder means pivotally mounted within the interior of the plane whereby air delivered from the compressor-propulsion may be deflected to right or left for control purposes.

DOUGLAS K. WARNER.